July 9, 1963            I. JEPSON            3,097,318
ELECTRIC POWER UNIT FOR HAND HELD FOOD MIXER
Filed May 13, 1959            4 Sheets-Sheet 1
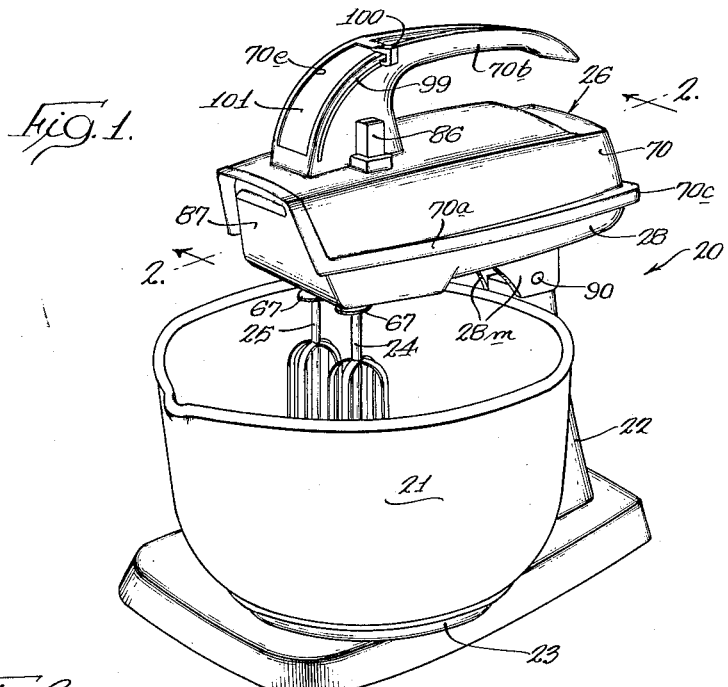
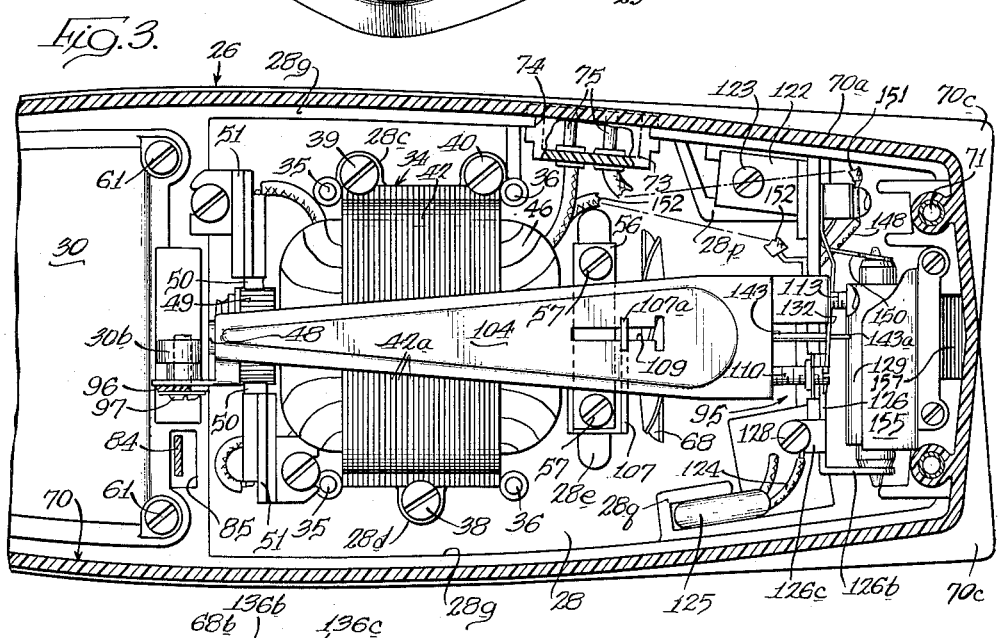
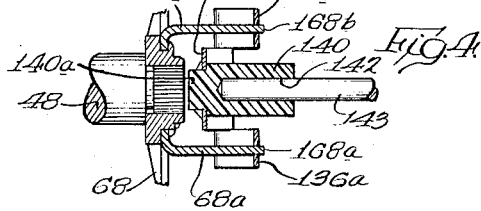
INVENTOR.
Ivar Jepson
BY George R. Clark
Atty.

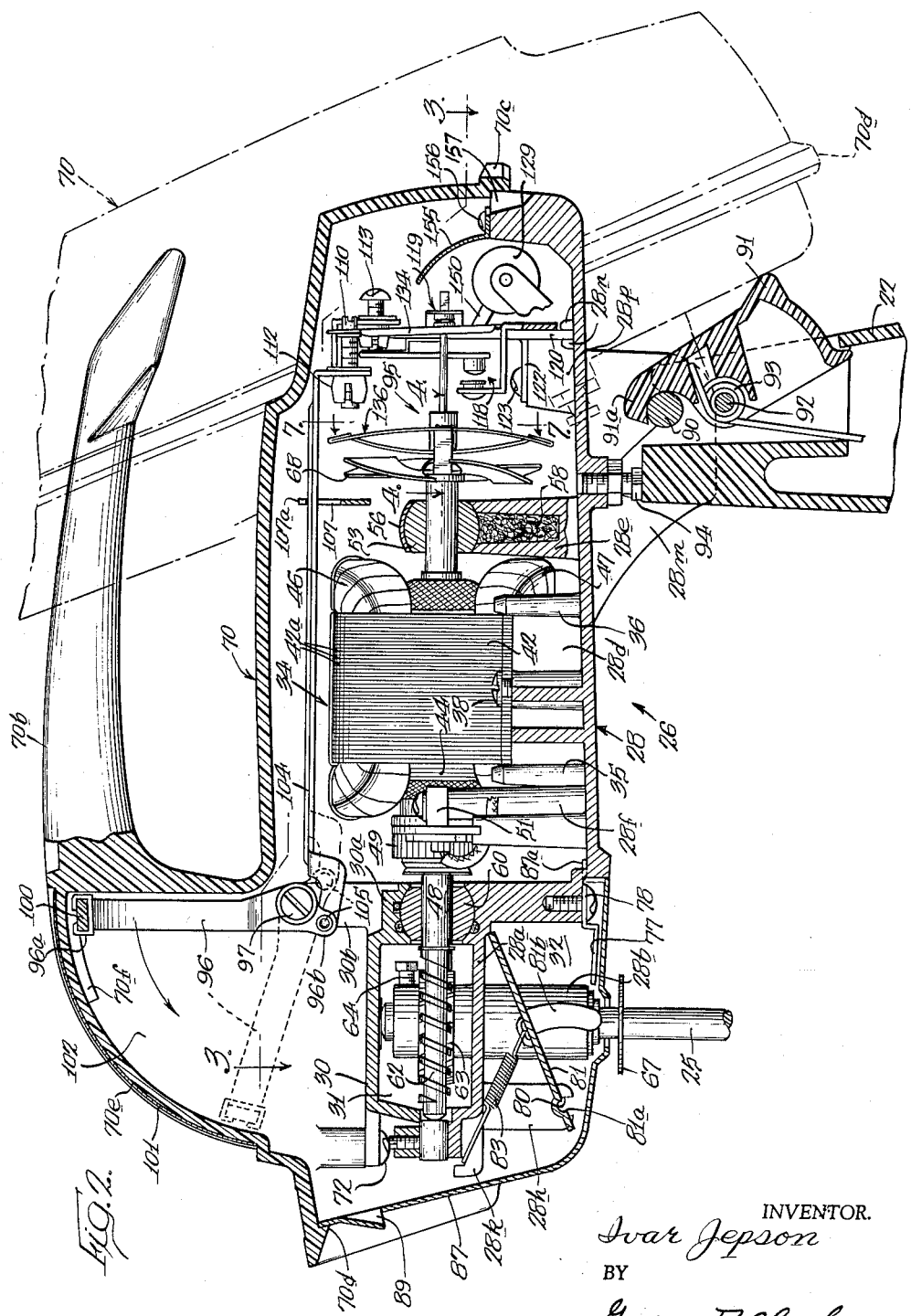

July 9, 1963 I. JEPSON 3,097,318
ELECTRIC POWER UNIT FOR HAND HELD FOOD MIXER
Filed May 13, 1959 4 Sheets-Sheet 3

INVENTOR.
Ivar Jepson
BY
George R. Clark
Atty.

July 9, 1963 I. JEPSON 3,097,318
ELECTRIC POWER UNIT FOR HAND HELD FOOD MIXER
Filed May 13, 1959 4 Sheets-Sheet 4

INVENTOR.
Ivar Jepson
BY
George R. Clark
Atty.

United States Patent Office 3,097,318
Patented July 9, 1963

3,097,318
ELECTRIC POWER UNIT FOR HAND HELD FOOD MIXER
Ivar Jepson, Oak Park, Ill., assignor to Sunbeam Corporation, Chicago, Ill., a corporation of Illinois
Filed May 13, 1959, Ser. No. 812,928
8 Claims. (Cl. 310—68)

This invention relates to electric power units and, more particularly, to such units useful in many applications such as in connection with household mixers used in food preparation. Specifically, the present invention is an improvement on the construction shown in Jepson Patent 2,703,381 assigned to the same assignee as the instant application.

The household food mixer has become a standard and necessary tool of the housewife and millions of such mixers are in use today. The more conventional of these household food mixers comprise a supporting stand with several mixing bowls and a mixing unit associated with the stand to perform a mixing operation. More recently there has been a demand for a small mixer without a stand, commonly referred to as a "hand mixer," which would involve a minimum storage problem and hence be especially desirable for use in small apartments and the like. The mixer of the present invention can be used either way, namely, with a stand and associated mixing bowls or without a stand.

The mixing unit of the present invention is in many respects very similar to that disclosed in copending application Serial No. 756,853—Jepson and Chambers, filed August 25, 1958 and assigned to the same assignee as the instant application.

In the above-mentioned copending Jepson and Chambers application, there is disclosed a household food mixer which is simple to build and assemble and which may readily be disassembled for repair purposes if the occasion should arise. The parts of the motor unit driving the beater are assembled on a base unit or the like in a completely operative manner so that by merely removing a housing portion most of the parts of the motor unit are exposed to view for ready replacement or repair and no question of disassembling bearings or the like occurs in exposing the mixer to view. Also disclosed and claimed in the above mentioned copending Jepson and Chambers application is an improved beater ejector which is simple and compact and which is incorporated in the mixer of the present invention in substantially the identical form employed in the copending application. In the mixer unit of the copending application referred to above limited speed control is obtained by means of employing a tapped winding on the motor and changing the taps thereof by a suitable switch mechanism. For a more accurate speed control however, a governor type device such as shown in the above mentioned Jepson patent is more desirable since it effectively permits an infinite speed control between certain limits. The present invention is concerned with an improved speed control mechanism which is simple and compact and which may be embodied in a mixer construction very similar to that in the copending Jepson and Chambers application referred to above.

Accordingly, it is an object of the present invention to provide a new and improved electric power unit.

It is another object of the present invention to provide a new and improved speed control mechanism for a motor unit where a variable speed is desirable.

Still another object of the present invention resides in the provision of a novel speed control mechanism for a motor driven appliance that has a minimum number of parts, that is efficient and provides a substantially frictionless drive between the actuating and actuated parts, that is sturdy in construction and yet that is extremely sensitive to perform the desired speed control function.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is a perspective view of an electric household mixer and supporting means therefor embodying the present invention and shown in a position for performing a mixing operation;

FIG. 2 is an enlarged longitudinal sectional view particularly of the motor unit taken on line 2—2 of FIG. 1 showing the motor unit in two positions on a supporting stand;

FIG. 3 is a fragmentary sectional view taken on line 3—3 of FIG. 2 assuming that FIG. 2 shows the complete structure;

FIG. 4 is an enlarged fragmentary sectional view taken on line 4—4 of FIG. 2;

Figure 5:
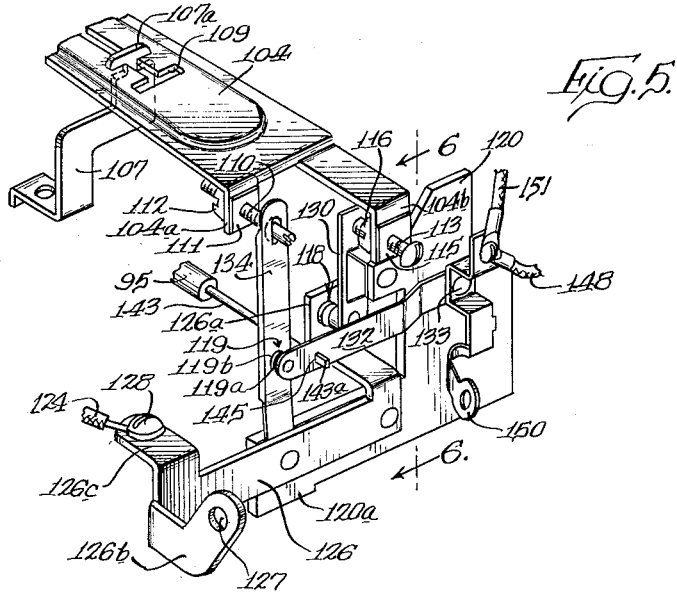
FIG. 5 is a fragmentary perspective view of a portion of the speed control mechanism of the present invention.

As in the above mentioned copending Jepson and Chambers application there is provided a base member which defines at least one side of the mixer housing upon which member is supported the motor field winding, the armature, cooling fan, gearing, brushes, control switch, speed governor and the like in a manner whereby all parts when assembled with the base unit are exposed to ready access. The housing is completed by applying a cover member which encloses the assembled mechanism. A very simple beater ejector is housed in a portion of the base and is operated in a foolproof manner. A very simple speed control mechanism is mounted at one end of the motor shaft and through a suitable linkage mechanism is connected to a speed control lever near the front of the mixer housing.

Referring now to the drawings wherein like reference characters designate corresponding parts throughout the several views, there is shown a household mixer generally designated by the reference numeral 20 which may be held in the hands of the housewife or other person while being used for a mixing operation to be performed in a suitable mixing bowl 21. If desired the mixer may be supported on a suitable stand generally indicated at 22 having a turntable 23 for the bowl 21. The mixer 20 includes the conventional beater elements 24 and 25 which are removable from an electrical motor driven unit contained in a suitable housing which unit is generally designated by the reference numeral 26.

Considering first the power of motor driven unit 26 for driving the beaters 24 and 25, there is provided a motor base unit 28 which comprises a casting of aluminum or other suitable material from which all elements of the power unit including the improved speed control mechanism of the present invention are supported. This base unit 28 is essentially a platform from which project various support members and the like, integrally formed with the platform. In many respects the base unit 28 is substantially the same as the base unit in the copending Jepson and Chambers application referred to above. As illustrated the base unit 28 includes a portion 28a at the forward part of the power unit defining a shallow upwardly opening recess which together with a suitable gear box 30 defines the gear chamber 31 (FIG. 2). Integrally formed with the portion 28a are downwardly directed spaced parallel sleeve portions 28b which house the driving spindles for the beaters 24 and 25. The base 26 is shaped to provide a recess 32 beneath the portion 28a into which recess the sleeves 28b depend. The recess 32 defines a beater ejector housing.

For the purpose of supporting a suitable electric motor generally designated at 34 the motor unit base 28 at the central portion thereof is provided on either side with upwardly directed supports 28c and 28d. Each of these supports comprises a pair of spaced upwardly directed pins 35 and 36 for positioning the motor 34 therebetween and one of the supports 28d includes a single tapped projection for receiving a clamping screw 38 while the other support 28c includes a pair of tapped projections for receiving clamping screws 39 and 40.

In order to support the rear bearing of electric motor 34, the base unit 28 is provided at the rear end thereof with a raised bearing support 28e (FIGS. 2 and 3). Similarly to support suitable brush retainers for a universal type electric motor such as motor 34 the base unit 28 is provided with brush holder supports on either side thereof designated at 28f, the supports for only one side of the motor being visible in FIG. 2 but the support for the other side being identical. As will become apparent from the ensuing description, the base unit 28 essentially defines the bottom of the housing of the power unit 26. To this end the base unit 28 is provided with an upwardly directed peripheral flange 28g, best shown in FIG. 3 of the drawings, which surrounds all but the forward end of the base unit 28 and, hence, provides a suitable shoulder for cooperation with a housing member described hereinafter.

The electric motor 34 comprises a stator 42 defined by a plurality of stator laminations 42a which are riveted together to form a stator assembly. The stator laminations are provided on either side thereof near the bottom with lateral projections so that the entire stator assembly is provided with a ledge for support on the projections 28c and 28d. The pairs of positioning projections 35 and 36 position the stator or field structure in the proper longitudinal position and the stator may then be secured on these supports by the clamping screws 38, 39 and 40 as mentioned above. As is fully described in the above copending Jepson and Chambers application, suitable means are provided between the stator 42 and the base 28 to assure accurate alignment of the parts whereby the stator 42 is clamped in the desired vertical and lateral position so as to be concentric with a suitable armature 44. The motor 34 also includes field or stator windings designated in FIGS. 2 and 8 of the drawings by the reference numerals 46 and 47, respectively.

The armature 44 is rotatably mounted with respect to the field structure including the field windings 46 and 47 and it is mounted for rotation with a suitable armature shaft 48. This armature shaft 48 also supports a suitable commutator 49 since the motor 34 is preferably a so-called universal motor capable of operating from a source of either alternating or direct current. Associated with the armature 48 are suitable brushes 50 supported in brush holders 51 which may be substantially identical with those disclosed in the above-mentioned copending Jepson and Chambers application.

For the purpose of supporting the armature 34 in a manner well understood by those skilled in the art, there is provided, as best shown in FIG. 2 of the drawings, a rear bearing 53 which is suitably supported from the projection 28e of the base 28. The bearing 53 is held in position by suitable bearing retainer 56 (FIGS. 2 and 3). A pair of screws 57 (FIG. 3) engaging tapped openings in the projection 28e hold the bearing retainer in position and, hence, also hold the bearing 53 in position. In order to lubricate the bearing 53, a suitable chamber defined within the support 28e is provided which retains suitable lubrication retaining means generally designated at 58.

As shown in FIG. 2 of the drawings, the forward end of the armature shaft 48 is suitably supported in a bearing 60 which is disposed in a suitable depression defined in the portion 28a of the base 28. The gear box cap 30 is provided with a suitable projection 30a which acts as a bearing retainer for the bearing 60. The gear box cover 30, as best shown in FIG. 3 of the drawings, is suitably secured by a plurality of screws 61 to the portion 28a to define the sealed gear chamber 31.

For the purpose of transmitting the rotation of the armature shaft 48 to the beater elements 24 and 25, there is provided on the end of the motor shaft 48 disposed within the gear chamber 31 a worm 62 which drives a pair of worm gears 63, only a portion of one of these worm gears being shown in FIG. 2 of the drawings. These gears 63 are each drivingly connected to a different one of a pair of hollow spindles as by set screws 64, which hollow spindles are rotatably mounted within the sleeve 28b and are adapted to be drivingly connected to the shafts of the beater elements 24 and 25. Rotation of the armature shaft 48 will thus cause rotation in opposite directions of the two worm gears 63 and, hence, of the beater elements 24 and 25. The beater elements may be provided with suitable washer elements designated as 67 for cooperating with a suitable beater ejector, it being understood that the beaters may be removed by applying a force along the longitudinal axis of the beater shanks in a direction away from the hollow spindles contained within the sleeves 28b.

It will be appreciated that the motor unit 26 should preferably be provided with air cooling means to cool the same, and to this end there is mounted on the shaft 48 and at the end thereof outside the bearing 53 a suitable fan 68 arranged to cause air to enter through suitable openings in the peripheral flange 28g of the base unit at the rear thereof and pass over the windings 46 and 47 of the motor 34 and out of the motor chamber at the front thereof.

In order to complete the housing for the power unit 26 there preferably is provided a cover member 70 formed of a molded plastic material which is provided with a depending flange 70a on the two sides and rear (FIG. 3) for cooperation with the peripheral flange 28g of the base unit 28. The cover member 70 is preferably provided with an integral handle portion 70b to permit the user to grasp the same during a mixing operation. Preferably the housing is secured to the base unit by suitable fastening means 71 (FIG. 3) at the rear thereof and 72 (FIG. 2) at the front thereof. To this end the cover member may be provided with integrally molded downwardly directed projections, which projections may be provided with tapped inserts to receive the fastening means 71 and 72.

So that electrical connection can be made with the motor 34, there is provided a cup-shaped cord receptacle 73 (FIG. 3) which on three sides thereof is provided with a circumferential groove to be received by the edges of a notch or recess 74 defined in the peripheral flange 28g. Disposed within the cup-shaped receptacle are suitable male type terminals 75 to which electrical connection may be made by a suitable cord connector. By making the connection at the motor unit 26 the storage problem is simplified, since the power cord can be separated from the unit, which is not the case with most prior art mixing units. The cup-shaped receptacle 73 is held within the notch 74 by having the top surface thereof engaged by the housing member 70. This provides a very simple assembly arrangement and yet assures that the receptacle and associated terminals 75 are properly positioned relative to the base 28. The rear end of the cover member 70 is provided with a narrow rearwardly extending flange or ledge 70c which with the end of the handle member 70b provides a firm support to permit the mixer effectively to stand on its rear end when not used in a mixing operation, particularly if the power unit is used without the stand 22, which may many times be the case.

Should the housewife desire to store the mixer unit 26 without using up shelf or drawer space in the kitchen, the unit is provided with means permitting it to be hung from a suitable support. Accordingly, there is provided at the forward end thereof and extending into the beater ejector chamber 32 a supporting plate 77 which preferably has a keyhole slot therein, not shown in the drawings. This supporting plate 77 is preferably secured to the base 28 as by means of the fastening means 78.

The beater ejector means is substantially identical with that disclosed in the above-mentioned Jepson and Chambers application. The base unit 28 is provided with a pair of trunnion supports 28h, only one of which is shown in FIG. 2 of the drawings, but each of which is provided with a downwardly directed trunnion receiving recess 80. Mounted for pivotal movement with respect to the trunnion receiving recesses 80 is a beater ejector plate 81. This plate is provided at either end thereof with a plurality of coaxially arranged trunnions 81a integrally formed with the plate 81. In addition, the plate includes a plurality of arcuate downwardly directed ejector arms 81b, one for each of the beaters 24 and 25. Upon downward pivotal movement of the plate 81 the arms 81b engage with the washers 67 associated with the beater shafts to cause ejection thereof. In order to hold the ejector plate 81 with its trunnions 81a in engagement with the trunnion receiving recesses and simultaneously to bias the ejector 81 to a non-ejecting position there is provided a tension spring 83 which has one end thereof secured to a suitable opening defined in the plate 81 and the other end thereof secured to a projection 28k integrally formed with the base 28 at the upward forward portion thereof.

For the purpose of manually actuating the ejector 81, when desired, it is suitably connected to a vertically movable ejector link 84, best shown in FIG. 3 of the drawings, which extends through a suitable opening 85 defined in the base plate 28 (FIG. 3) which link has the upper end thereof connected to a suitable control knob 86 which is rectangular in shape and which is receivable in a corresponding rectangular opening in the cover member 70. Preferably and as fully described in the copending Jepson and Chambers application, the handle portion 70b of the cover member 70 has a recess or undercut portion to accommodate a part of the ejector knob 86. The upper shoulder of this recess defines a stop for the knob thus defining the upper pivotal movement of the spring biased ejector plate 81. When the housewife desires to eject the beaters 24 and 25, all she need do is press downwardly on the knob 86 thus causing the ejector plate 81 to pivot about the axis of trunnions 81a in a clockwise direction, as viewed in FIG. 2 of the drawings, against the force of the tension spring 83.

For the purpose of enclosing the beater ejector chamber 32 there is provided a closure or escutcheon plate 87 which preferably is merely snapped into place. As illustrated this plate 87 is provided with a plurality of integral tabs 87a which engage suitable openings in the base member 28 defining air passageways between the motor chamber and the ejector chamber 32. The forward end of the escutcheon plate preferably snaps behind a suitable shoulder defined by a projection 70d (FIG. 2). To permit cooling air drawn through the motor housing to pass out of the beater ejector chamber 32, the escutcheon plate 87 is provided with a deformation defining an air outlet opening 89. The escutcheon plate is, of course, provided with suitable openings for the beater shafts, and the beater ejector arms 81b. Also a keyhole-shaped opening, not shown, aligned with the similar opening in the plate 77 is provided.

So that the motor unit 26 may be supported from the stand 22, or may readily be removed therefrom by the operator to use without the stand, the base of the power unit at the rear thereof is provided with a pair of spaced downwardly directed parallel extensions 28m between which extends a mounting pin 90. The upper part of the stand 22 supports a combined trigger and hook member 91 pivotally mounted thereto as by pivot pin 92. Additionally, a torsion spring 93 biases the trigger and hook member 91 into the position clearly shown in FIG. 2 of the drawings. When it is desired to release the unit 26 from the stand 22, the operator merely engages the trigger member 91 with his thumb and pivots it in a clockwise direction, as viewed in FIG. 2 of the drawings, to release the hook portion 91a thereof from the pin 90. Preferably, an adjustable screw 94 threadedly engages a tapped portion of the base 28 adjacent the top of the stand 22 to provide an adjustable stop for limiting and adjusting the horizontal position of the motor unit 26. Thus, the unit 26 can readily be pivoted about the pin 90 to assume the two positions shown in FIG. 2 of the drawings.

For the purpose of providing accurate speed control for the electric motor 34, the rear portion of the base 28 serves as a support and housing for a speed control device and associated parts thereof generally designated at 95. Since the housewife, particularly when using the power unit 26 as a hand mixer, will be holding the same by the handle 70b, it is desirable that the manual adjusting means for speed control means be adjacent the front of this handle 70b. To this end there is provided a bell crank type lever 96 which is pivotally mounted about a shouldered screw 97 threadedly engaging a tapped opening in a projection 30b of gear box cap 30. The upper end of the bell crank lever 96 is provided with an integrally formed lateral projection 96a adapted to project through an arcuate slot 99 (FIG. 1) defined in the handle portion 70b. A suitable U-shaped control knob 100 is secured to the lateral projection 96a in a manner so that one arm of the U extends into the slot 99 and the other arm of the U rides over the top of the handle 70b. Preferably, this portion of the handle 70b above the slot 99 is provided with a recessed portion 70e into which suitable indicia generally designated as 101 may be applied, which indicia indicates the various settings of the speed control knob 100, most desirable for certain specified beating or whipping operations.

It will be apparent from the ensuing description that the control knob 100 permits an infinite speed variation between the extreme positions thereof. Preferably, the indicia 101 also includes an "off" position which is the illustrated solid line position of the bell crank 96 in FIGS. 1 and 2 of the drawings. The dotted line position of the bell crank 96 in FIG. 2 is the maximum speed position. The speed control knob 100 preferably includes some sort of indicator such as a line indicated thereon or a point which enables the user to readily determine the exact setting thereof with reference to the indicia 101.

In order to assemble the control knob 100 to the bell crank lever 96, the lower leg of the U-shaped control knob 100 is forced axially into resilient gripping engagement with the projection 96a. To prevent the bell crank lever 96 from being deflected away from the slot 99 upon assembly of the control knob 100 to the projection 96a, the handle 70b may be provided with an integral projection 70f clearly shown in FIG. 2 of the drawings, which serves to support the bell crank 96 against deflection during the assembly of the control knob 100 thereto. It will be apparent that the handle 70b effectively includes a chamber 102 within which the bell crank 96 moves and the off position of the lever 96 is limited by one end of this chamber as well as one end of the slot 99.

To transmit the motion of the lever 96 to the rear of the housing for the unit 26 where the speed control mechanism, generally designated at 95, is located, there is provided a generally horizontally disposed connecting link 104 having its forward end pivotally connected to the arm 96b of bell crank 96 as by a rivet or pivot pin 105.

For the purpose of guiding the horizontally disposed connecting link 104 without interfering with movement along the longitudinal axis thereof, there is provided a connecting link guide 107 which is suitably supported by the rear bearing support 28e and secured thereto by one of the screws 57 holding the rear bearing retainer 56 in position. This guide 107 for the connecting link 104 includes a somewhat T-shaped uppermost position 107a, best shown in FIG. 5 of the drawings, which is adapted to extend through a T-shaped slot 109 in the connecting link 104. The head portion of the T-shaped slot 109 permits ready insertion of the T-shaped portion 107a of the guide 107 to permit ready assembly of the mechanism. It will be appreciated that the guide 107 supports the connecting link 104 above the motor so as not to interfere with the motor in any manner and yet permits reciprocal motion thereof in the direction of its longitudinal axis whenever the bell crank 96 is actuated through the speed control knob 100.

For performing certain switching and control functions, the connecting link 104 at its end remote from the pivot pin 105 has two integrally formed downwardly directed stop members 104a and 104b, the stop member 104a being designated as the first stop for adjusting the speed control setting and the rearmost stop 104b being a second stop for controlling a suitable "on-off" switch for the power unit. For the purpose of electrically insulating the connecting link 104 and particularly the stops 104a and 104b from certain electrical components to be actuated thereby and described hereinafter, there is provided a screw 110 which is secured to the stop 104a as by a nylon insulating sleeve 112 which is received in an opening in the end of the stop 104a. The sleeve 112 is provided with a flange 111 which abuts the stop 104a. The sleeve is split longitudinally from one end and is of such an internal diameter that it is expanded when threadedly engaged by the screw 110. As a result of this expanding action produced by the screw 110, the diameter of the sleeve 112 is increased to such an extent as to lock the sleeve in the opening in stop 104a with the flange 111 against the stop 104a. In a similar manner, an adjustable screw 113 for performing a control function is secured to the stop portion 104b of the link 104 by a split nylon insulating sleeve 116 having a flange portion 115. The insulating sleeve 116 is retained in assembled relation to the stop portion 104b through the expansion of the sleeve resulting from the threaded engagement by the screw 113.

The electrical control mechanism forming a part of the speed control unit 95 comprises two serially connected switches, an on-off switch generally designated at 118 comprising a relatively stationary contact 118a and a movable contact 118b, and a governor controlled switch 119 which comprises a pair of relatively movable contacts 119a and 119b. These switches 118 and 119 are suitably mounted on a somewhat L-shaped insulating support 120 which may be formed of a paper based phenolic resin laminate or similar material. One arm of the L-shaped support 120 is disposed substantially parallel with the bottom of the base 28 and is preferably supported in a notch defined between a pair of integral projections 28n (FIGS. 2 and 6) of the base 28. Moreover, to maintain the insulating support member 120 in a fixed vertical position within the housing of the unit 26, there is provided an L-shaped bracket 122 which has one arm of the L riveted or otherwise secured to the insulating support 120 and the other arm is fastened as by a screw 123 to an integral support or projection 28p provided integrally with the base unit 28.

In order to support the contact 118b of the on-off switch 118 which is illustrated as a stationary contact, there is provided a conducting bracket member 126 which is suitably secured as by rivets or the like to the insulating support plate 120. This conducting bracket 126 includes an L-shaped arm 126a supporting the contact 118a. It also includes an integral extension 126b having an opening 127 therein for supporting a suitable resistor 129, described hereinafter. The conducting bracket 126 further includes a lateral extension 126c by means of which electrical connection is readily made as by a screw 128 with a conductor 124 which in turn is electrically connected to a capacitor 125. The capacitor 125 is suitably retained within a pocket defined by an L-shaped projection 28q integrally formed with the base unit 28 and best shown in FIG. 3 of the drawings.

Figure 6:
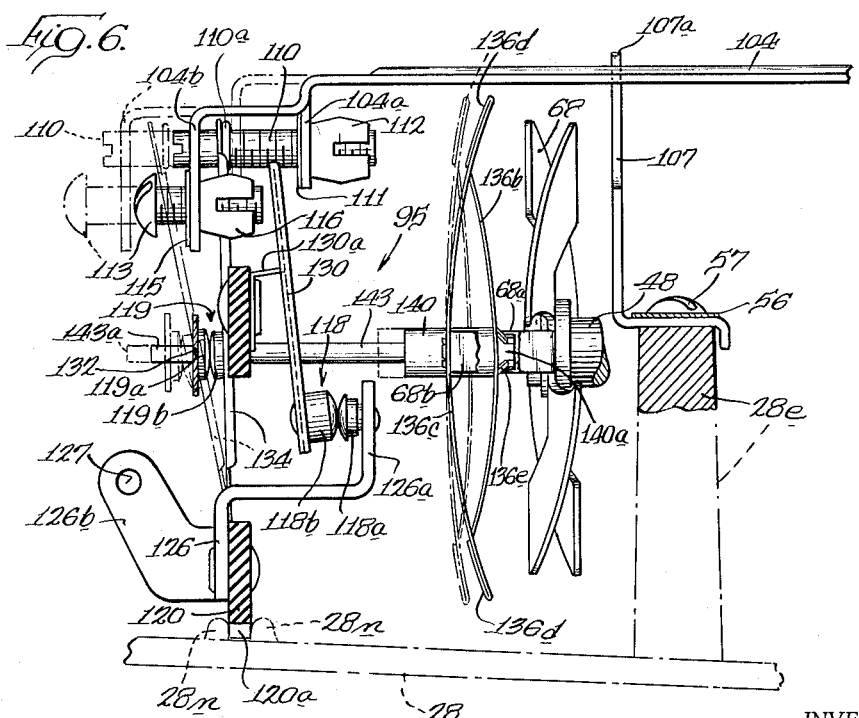
FIG. 6 is an enlarged sectional view taken on line 6—6 of FIG. 5, but with the on-off switch in the closed position and certain portions of the apparatus shown in different positions which it may assume during an operating cycle.

For the purpose of supporting the contact 118b of the on-off switch 118, which might be designated as a movable contact, there is provided a contact supporting member 130 which is supported from the insulating support 120 by a spring-like portion 130a integrally formed with the contact support 130. As illustrated best in FIG. 6 of the drawings, the contact support 130 is effectively pivotally mounted at an intermediate portion thereof by the spring-like projection 130a and the movable contact 118b is supported from the lower end thereof. The upper end of the contact support 130 extends upwardly a sufficient distance so as to be engageable by the screw 113 of the stop member 104b so that when the connecting link 104 is moved sufficiently far to the right, as viewed in FIG. 6 of the drawings, the contact support 130 is pivoted in a clockwise direction to open the switch 118. This takes place only when the bell crank lever 96 is in the solid line position shown in FIGS. 1 and 2 of the drawings. The screw 113 is initially adjusted so that as soon as any slight movement occurs of the link 104 to the left, as viewed in FIG. 6 of the drawings, screw 113 moves away from the contact support 130 so that the inherent resiliency of the resilient support 130a biases the contact support 118b into the closed position shown. FIG. 6, of course, discloses support 130 in a position different from that shown in FIG. 2 of the drawings where the contacts 118 would be opened.

As mentioned above, the speed control mechanism 95 also includes the switch 119 which is opened and closed in response to the speed of the motor and which switch 119 is, of course, connected in series with the on-off switch 118 already described. As illustrated in the drawings, the contact 119a is supported on a resilient horizontally disposed switching arm 132 which is supported from the insulating support 120 as by suitable rivet 133. The other contact 119b of the governor controlled switch 119 is supported on a switch arm 134 whose lower end is electrically connected with the conducting bracket 126, thus connecting the contact 119b in series with the contact 118a through the conducting bracket 126. The support 134, although of somewhat channel shape at its upper end to provide sufficient rigidity, is very resilient near the lower end thereof and is inherently biased in a direction toward the right, as viewed in FIG. 6 of the drawings, so that the upper end thereof engages a shoulder 110a defined on the screw 110 associated with the stop 104a. It will be apparent then, that as the connecting link 104 is moved to the left, as viewed in FIG. 6 of the drawings, which is the speed increasing direction, that the contact 119b will similarly be moved to the left into firmer engagement with the contact 119a, which means that the governor to be described hereinafter must move the contact 119a a substantially greater distance in order to interrupt the circuit at the governor controlled switch 119.

Figure 7:
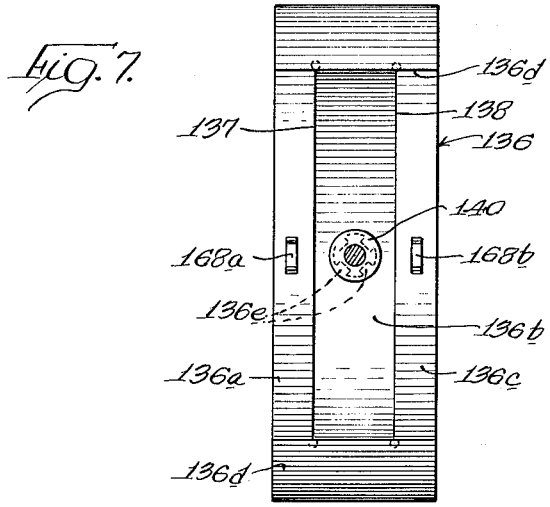
FIG. 7 is a view looking in the direction of the arrows 7—7 of FIG. 2 but eliminating everything except the centrifugal speed control mechanism.

For the purpose of actuating the switch 119 in response to the speed of rotation of the motor 34, there is provided a centrifugal governor member generally indicated at 136, best shown in FIGS. 2, 4, 6 and 7 of the drawings. As there illustrated, the speed control element comprises a one-piece speed sensitive member, generally designated 136, which is slotted as indicated at 137 and 138 to provide three adjacent parallel strips 136a, 136b and 136c. To increase the weight of the element 136 at the ends thereof, the ends are bent back upon themselves as indicated at 136d. This speed sensitive member 136 is secured to the end of the motor shaft 48 remote from the worm 62 and, in fact, to the end thereof which extends to the right of the bearing support 28e, as viewed in FIG. 2 of the drawings. As illustrated in the drawings, the fan 68 is actually secured to the end of the shaft 48 and in order to secure the speed sensitive element 136 so as to rotate with the shaft 48 the fan 68 is provided with integrally formed axially extending arms 68a and 68b, which are staked or otherwise secured to the outside strips 136a and 136c of the element 136 as best shown in FIGS. 4 and 7 of the drawings.

A suitable thrust bearing member, preferably formed of nylon or similar material and designated as 140, has a reduced end 140a thereof inserted or pressed into an opening defined in the center strip 136b. Preferably the opening in the strip 136b is provided with a plurality of fingers 136e to fit into corresponding grooves provided in the portion 140a of thrust bearing 140 therefore insuring rotation of the thrust bearing 140 with the centrifugal member 136. Thus the thrust bearing member 140 is secured to the center strip 136b so as to extend along the axis of the shaft 48 between the two strips 136a and 136c. In fact, the speed control member 136 is stressed so that normally the strip 136b and the strips 136a and 136c are bowed, as clearly shown in FIG. 6 of the drawings. It will be apparent that centrifugal force will tend to cause the bent-over ends 136d of element 136 to move as far away from the axis of rotation of shaft 48 as possible, which will cause a straightening of the member 136 and, hence, less bowing as clearly indicated in dotted lines in FIG. 6 of the drawings. Such action will cause the strip 136b, which is free to move relative to the strips 136a and 136c, to move in a direction away from the end of the shaft 48 and, hence, in a direction toward the insulating support 120 and the associated switches mounted thereon which are located more remote from the motor 34 than is the speed control element 136.

In order to actuate the governor controlled switch 119 in response to the speed of rotation of the motor 34, the thrust bearing 140 is provided with a recess, or pocket, 142 rotatably to receive one end of a rod member 143 which is illustrated as having its other end 143a extending through an opening 145 in the resilient contact support 132. The end 143a of the rod 143 is flattened and a correspondingly shaped opening 145 is provided in the arm 132 thereby preventing rotation of the element 143 and furthermore providing a shoulder on the rod 143 so that longitudinal movement of the rod 143 will cause movement of the resilient arm 132, and hence, cause opening and closing of the switch 119 in response to the speed of rotation of the shaft 48.

With the construction described above, it will be apparent that speed control is obtained by continually opening and closing the governor controlled switch 119 effectively to interrupt the power circuit to the motor 34. To prevent arcing by virtue of the periodically opening and closing of the switch contacts 119a and 119b, the capacitor 125 is provided. This capacitor is connected across the contacts 119a and 119b by the conductor 124 already described and a conductor 148, best shown in FIGS. 3 and 8 of the drawings. For the purpose of dissipating the energy stored in the capacitor 125, the resistor 129, already described, is provided which is similarly connected across the contacts of the switch 119. As illustrated in the drawings, the resistor 129 is of the ceramic type having end terminals, one of which is receivable within the opening 127 of the bracket 126b. A resilient bracket 150 is provided for engaging the terminal at the other end of the resistor 129 and this bracket is suitably supported from the insulating support 120. It will be appreciated that a considerable heat dissipation will be involved with respect to the resistor 129. In order that this will not adversely affect the housing 70 which is preferably formed of a molded plastic, there is provided a heat shield 155 suitably fastened to the flange 28g of the base unit 28 at the rear thereof as by fastening means 156. Additionally the base unit 28 is provided at the rear with a recess 157 (FIG. 2), which defines an air inlet port for the air drawn by the fan 68. The air passing through this port cools the heat shield 155 and hence also the plastic housing 70. This opening defined by the recess 157 is in addition to the openings referred to above through which cooling air for the motor unit 28 is drawn.

Figure 8:
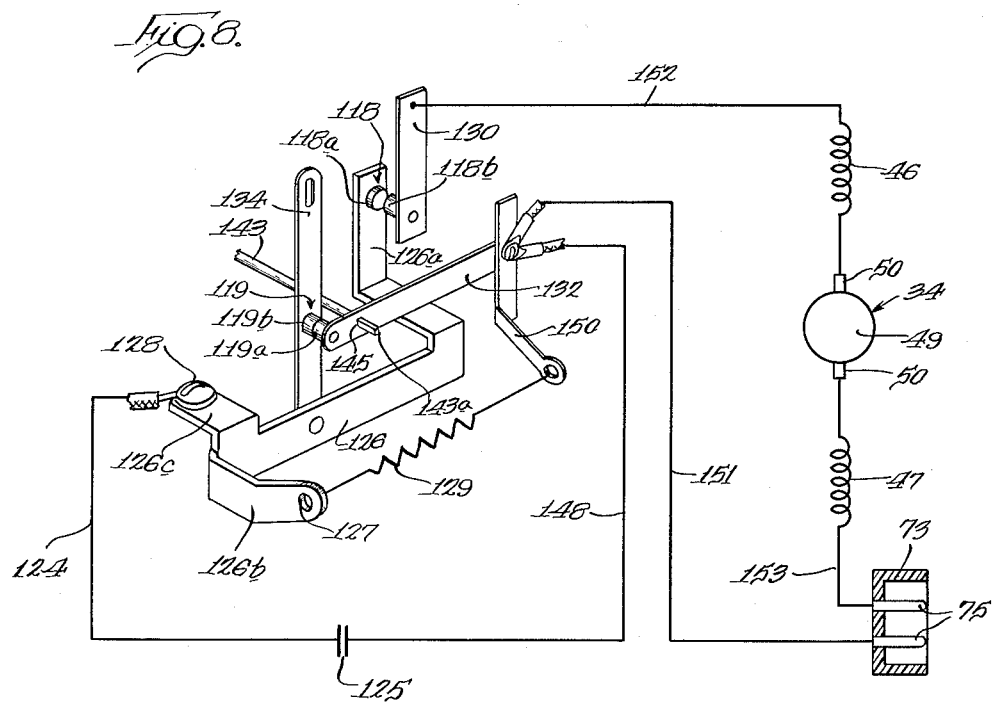
FIG. 8 is a circuit diagram illustrating schematically the electrical control circuit of the motor unit of the present invention.

To complete the electrical circuit for the motor 34, and with reference to FIG. 8 of the drawings, one terminal 75 disposed in the cord receptacle 73 is connected by a conductor 151 with the resilient contact arm 132, and a conductor 152 electrically connects the contact support 130 with one stator winding 46. The motor circuit is completed from winding 46 through the brushes 50, the commutator 49, the other stator winding 47, and a conductor 153 to the other terminal 75 of the cord connector 73.

With this arrangement it will be apparent that the motor 34 is connected to a source of power through serially arranged switches 118 and 119. The switch 118 is, of course, the on-off switch and is merely controlled by the connecting link 104. The switch 119 is the governor controlled switch which is controlled by the centrifugal governor including the axially movable rod or needle 143. It will be appreciated that if desired certain additional capacitors may be included in the circuit of FIG. 8 to prevent or eliminate radio interference.

In view of the detailed description included above, the operation of the apparatus of the present invention will readily be understood by those skilled in the art. It will be apparent that there has been provided a power unit in which upon removal of the housing portion 70 the entire motor and speed control mechanism is exposed to view and can be operated so as to examine the same for any defects or misoperation. Repair and replacement therefor is accomplished in a very simple manner. Additionally, a very compact and inexpensive speed control means is provided.

Although there has been described and illustrated a specific embodiment of the present invention it will be understood that various changes and modifications will occur by those skilled in the art and it is aimed in the appended claims to cover all such changes and modifications as fall within the true spirit and scope of the present invention.

What is claimed as new and desired to be secured by Letters Patent of the United States is:

1. An appliance comprising a platformlike support, a motor having a shaft extending along the length of said support and generally parallel therewith, a gear casing at one end of said support, one end of said shaft extending into said gear casing, bearing means for said shaft mounted on said support, a centrifugally responsive member secured to the other end of said shaft, a cover for said support including a handle portion, said cover defining with said support a housing for said motor and gear casing, means defining a recess in said handle portion, an arcuate slot in said handle portion leading to said recess, a bell crank pivotally supported within said housing, one arm of said bell crank including manually actuatable means extending outside said housing through said arcuate slot, switch means mounted at the end of said support remote from said gear casing and connected in the energization circuit of said motor, means actuated by said centrifugally responsive member for operating said switch means in dependence upon the speed of rotation of said motor shaft, positioning means for selectively adjusting said switch means to different speed settings, and a longitudinally movable link having one end connected to said bell crank and the other end connected to said positioning means.

2. In a power unit for a food mixer, the combination of a platformlike support, a motor having a shaft extending along the length of said support and generally parallel therewith, a gear casing at one end of said support, one end of said shaft extending into said gear housing, bearing means for said shaft mounted on said support, a cover secured to said support and with said support defining a housing for said motor and gear casing, a handle secured to said cover including a recess therein, an arcuate slot in said handle leading to said recess, a centrifugally responsive member secured to the other end of said shaft, a bell crank pivotally supported within said housing and having one end thereof extending into said recess and movable in a path concentric with said arcuate slot, switch means mounted at the end of said support remote from said gear casing and connected in the energization circuit of said motor, means actuated by said centrifugally responsive member for operating said switch means in dependence upon the speed of rotation of said motor shaft, positioning means for selectively adjusting said switch means to different speed settings, and a longitudinally movable link having one end connected to an arm of said bell crank and the other end connected to said positioning means.

3. In an appliance, the combination of a platformlike support, a motor having a shaft extending along the length of said support and generally parallel therewith, a gear housing at one end of said support, one end of said shaft extending into said gear housing, bearing means for said shaft mounted on said support, a centrifugally responsive member including a planar sheet metal plate having a central portion thereof deflectable relative to side portions secured to the other end of said shaft, a bell crank pivotally supported from said gear housing, switch means mounted at the end of said support remote from said gear housing and connected in the energization circuit of said motor, means actuated by said centrifugally responsive member for operating said switch means in dependence upon the speed of rotation of said motor shaft, positioning means for selectively adjusting said switch means to different speed settings, and a longitudinally movable link having one end connected to said bell crank and the other end connected to said positioning means.

4. In a power unit for a food mixer, an electric motor, control means for said motor including switch means comprising a first set of relatively movable contacts, a second set of relatively movable contacts connected in series with said first set of contacts, each of said sets of contacts being normally biased to the closed position, a manually actuatable member affecting both of said sets of contacts, said member including means for actuating said first set of contacts to the open position at one extreme position thereof, but permitting said first set of contacts to close in all other positions thereof, said member including means for selectively controlling the relative position of one of the contacts of said second set of contacts, speed control means for controlling the relative position of the other of said second set of contacts, and a parallel arranged resistor and capacitor connected across one of said sets of serially connected contacts.

5. The power unit of claim 4 wherein said motor and control means are disposed within a housing defined in part by a plastic member, and a heat deflector disposed between said resistor and plastic member.

6. In a speed responsive device for a home appliance of the type having an electric motor and governor actuated speed control means, the combination with said motor of a speed responsive member rotatable with the motor shaft comprising a unitary elongated plate having a pair of spaced longitudinal slits cut therein to define three parallel strips interconnected at opposite ends thereof, the midpoint of the center strip of said three strips being normally disposed at a different position along the longitudinal axis of said motor shaft than the midpoint of said other two strips, the particular position of said midpoint of said center strip being dependent on the speed of rotation of said motor shaft, and means operative in dependence upon the various positions of the midpoint of said center strip for controlling the speed of said motor.

7. The speed responsive device of claim 6 wherein the interconnected ends of said three parallel strips are folded over.

8. The speed responsive device of claim 6 wherein the midpoints of said other two strips are fixed relative to the motor shaft.

References Cited in the file of this patent

UNITED STATES PATENTS

| | | |
|---|---|---|
| 2,099,050 | Chamberlain | Nov. 16, 1937 |
| 2,469,932 | Ritter | May 10, 1949 |
| 2,610,314 | Morse | Sept. 9, 1952 |
| 2,703,381 | Jepson | Mar. 1, 1955 |
| 2,719,945 | Tull | Oct. 4, 1955 |
| 2,737,603 | Gerry | Mar. 6, 1956 |
| 2,907,226 | Gasparotti | Oct. 6, 1959 |
| 2,987,636 | Jepson | June 6, 1961 |